L. T. BULLEY.

SEPARABLE FASTENER.

APPLICATION FILED DEC. 6, 1918.

Reissued Feb. 25, 1919. 14,595.

Inventor:
Louis T. Bulley,
by Emery Booth Janney & Varney.
Attys

UNITED STATES PATENT OFFICE.

LOUIS T. BULLEY, OF WEST HAVEN, CONNECTICUT, ASSIGNOR, BY MESNE ASSIGNMENTS, TO CARR FASTENER COMPANY, OF CAMBRIDGE, MASSACHUSETTS, A CORPORATION OF MAINE.

SEPARABLE FASTENER.

14,595. Specification of Reissued Letters Patent. Reissued Feb. 25, 1919.

Original No. 1,246,868, dated November 20, 1917, Serial No. 178,332, filed July 3, 1917. Application for reissue filed December 6, 1918. Serial No. 265,646.

*To all whom it may concern:*

Be it known that I, LOUIS T. BULLEY, a citizen of the United States, residing at West Haven, in the county of New Haven and State of Connecticut, have invented a new and useful Improvement in Separable Fasteners; and I do hereby declare the following, when taken in connection with the accompanying drawings and the characters of reference marked thereon, to a be a full, clear, and exact description of the same, and which said drawings constitute part of this application, and represent in—

Figure 1:
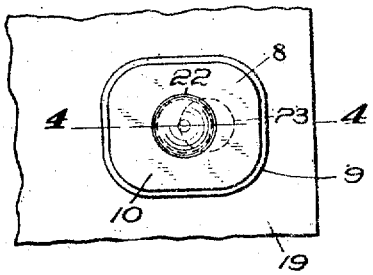

Figure 1 a plan view of the socket-member of a separable fastener constructed in accordance with my invention and shown as attached to a curtain.

Figure 2:
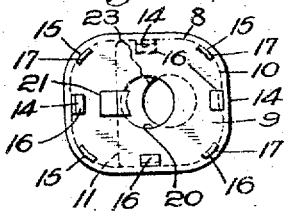

Fig. 2 an underside view of the socket-member, detached.

Figure 3:
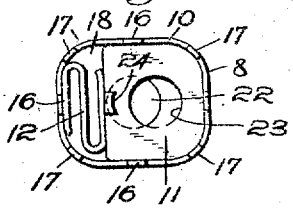

Fig. 3 an inside view of the front-plate, slide and spring, with the back-plate detached.

Figure 4:
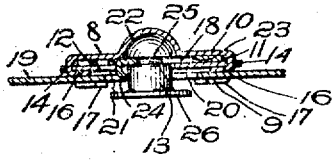

Fig. 4 a longitudinal sectional view showing the socket-member engaged with the post and in the locked position.

Figure 5:
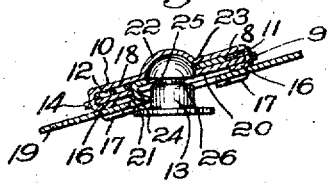

Fig. 5 a similar view showing the socket tilted to unlock the slide from the post.

Figure 6:
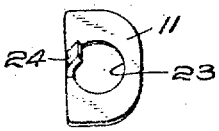

Fig. 6 a perspective view of the slide, detached.

Figure 7:
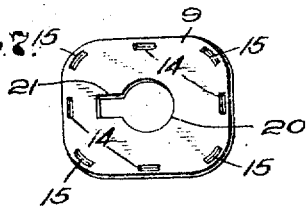

Fig. 7 a perspective plan view of the back-plate, detached.

This invention relates to an improvement in separable fasteners, and while adapted for various purposes, is especially designed for use as a curtain fastener. In the more general construction of fasteners of this type, the socket member includes a wire which is adapted to directly engage with a post.

The object of this invention is to provide a sheet-metal slide which will positively engage with the post so as to interlock the socket therewith, and to provide that slide with a finger adapted to engage with the post and move the slide when the socket is turned in one direction; and the invention consists in the construction hereinafter described and particularly recited in the claims.

In carrying out my invention, the socket-member 8 comprises a back-plate 9, a front-plate 10, a slide 11, and a spring 12. The back-plate is formed around its edge with two series of slots 14 and 15 through which project fingers 16 and 17 on the front-plate 10, the fingers 16 being turned down over the back-plate 9 so as to interlock the front-plate with the back-plate, the front-plate being slightly cup-shaped so as to form a chamber 18 between them. The fingers 17 form prongs by which the socket-member may be attached to a curtain 19. The back-plate is also formed with a central opening 20 in one side of which is a notch 21 for the purpose as will hereinafter appear. The front plate 10 is formed with a central recess 22 in line with the opening 20 in the back-plate. The slide 11 is located between the front and back-plate and is formed with a clearance-opening 23 corresponding to the opening 20, and with a projecting cam-finger 24 which extends through the notch 21 in the back-plate and is slightly curved so as to engage with one side of a post 13. This post 13 is formed with an annular groove 25 the outer wall of which forms a bearing-shoulder 26 for the slide 11. Within the chamber 18 is an S-shaped spring 12 which bears against the wall of the front plate and against the edge of the slide 11, normally tending to crowd the finger 24 against the post 13, as shown in Figs. 4 and 5 of the drawings. The socket-member is engaged with the post by passing it over the outer end of the post, the slide moving against the pressure of the spring to permit the head of the post to pass through the openings 20 and 23. As soon as the socket is moved onto the post sufficiently the slide will spring into the annular groove 25 and thereby firmly interlock the socket with the post. In order to move the slide out of engagement with the post, it is necessary to lift one end of the socket so as to cause the finger 24 acting like a cam, to move the slide so as to bring the opening 23 into line with the opening 20, and permit the socket to be lifted off from the post. As will be seen by Fig. 5 of the drawings, the tilting of one side of the socket crowds the finger 24 against the side of the post so as to move the slide with respect to the front and back-plates. It will thus be seen that while the socket may be readily detached from the post when the socket is tilted in one direction, the socket will be positively interlocked with the post against movement in any other direction. By using a sheet-metal locking slide a more rigid engagement is made between the socket and the post than is possible when wire springs are employed to form the lock.

While I prefer to form the front plate with the recess 22 to give clearance for the head of the post, as in this way the mechanism is completely housed and the possibility of dirt and water entering the fastener is avoided, it is obvious, without further illustration, that instead of forming the front plate with a recess, it might be formed with a perforation to allow for the clearance of the head.

I claim:—

1. In a separable fastener, a socket-member comprising front and back-plates, a sheet-metal slide located between the front and back-plates and provided with a finger projecting outward through the back-plate, and a spring between the front and back-plates and bearing against the said slide.

2. A separable fastener comprising a socket-member including a front and back-plate, a sheet-metal slide located between the front and back-plates, said back-plate and slide each formed with perforations, the slide formed with a finger projecting outward through the back-plate, combined with a post formed with an annular groove and adapted to extend through the perforations in the back-plate and slide, the slide adapted to enter the groove in the post, and the finger on the slide engaged with the side of the post.

3. A separable fastener comprising a socket-member including a front and back-plate, a sheet-metal slide located between the front and back-plates, said back-plate and slide each formed with perforations and the front-plate formed with a recess in line with the perforation in the back-plate, the slide formed with a finger projecting outward through the back-plate, combined with a post formed with an annular groove and adapted to extend through the perforations in the back-plate and slide, the slide adapted to enter the groove in the post, and the finger on the slide engaged with the side of the post.

4. In a separable fastener, a stud having a head providing an abrupt shoulder, a socket member including a casing, a slide located within the casing, a spring urging the slide into engagement with the abrupt shoulder on the stud and means operable by relative tipping movement of stud and socket in one direction for retracting said slide from engagement with said shoulder.

5. In a separable fastener, a stud having a head, a neck and a shank portion, a socket providing a casing and a jaw for engagement with said neck movably located in the casing and means operatively connected to said jaw for engagement with the shank of the stud when stud and socket are relatively tipped for moving said jaw out of engagement with said neck.

6. A separable fastener comprising, in combination, a stud having a head, a neck and a shank portion; a socket providing a casing and a jaw resiliently movable therein into engagement with said stud, and a part connected to said jaw and positioned to engage the shank portion of said stud, when stud and socket are relatively tipped, thereby to retract said jaw and permit separation of stud and socket.

7. A separable fastener comprising, in combination, a stud having a head, a neck and a shank portion; a socket providing a casing and a jaw resiliently movable therein into engagement with said stud, and a rearwardly projecting part connected to said jaw and positioned to engage the shank portion of said stud, when stud and socket are relatively tipped, thereby to retract said jaw and permit separation of stud and socket.

8. A separable fastener comprising, in combination, a stud having a head, a neck and shank portion; a socket providing a casing and a jaw resiliently movable therein into engagement with said stud, and a rearwardly projecting, longitudinally inclined part connected to said jaw and positioned to engage the shank portion of said stud, when stud and socket are relatively tipped, thereby to retract said jaw and permit separation of stud and socket.

9. A separable fastener comprising, in combination, a symmetrical stud having a head and a neck providing between them an abrupt shoulder; a socket providing a casing and a jaw resiliently movable therein into engagement behind said abrupt shoulder, said stud and socket being organized to permit substantial relative tipping movement of said stud and socket in one direction only and to retract said jaw and permit separation of said stud and socket by relative tipping movement in said one direction.

In testimony that I claim the foregoing as my own, I have hereto affixed my signature.

LOUIS T. BULLEY.